(12) United States Patent
Yonenoi

(10) Patent No.: US 6,578,787 B2
(45) Date of Patent: Jun. 17, 2003

(54) METHOD AND BOBBIN HOLDER FOR MANUFACTURING A FISHING FLY

(76) Inventor: Kimio Yonenoi, B-117 5-5-1 Eda-Nishi Aoba-ku, Yokohama-shi Kanagawa-ken (JP)

(*) Notice: Subject to any disclaimer, the term of this patent is extended or adjusted under 35 U.S.C. 154(b) by 29 days.

(21) Appl. No.: 09/793,180

(22) Filed: Feb. 26, 2001

(65) Prior Publication Data

US 2001/0042296 A1 Nov. 22, 2001

(30) Foreign Application Priority Data

May 16, 2000 (JP) ........................................ 2000-183758

(51) Int. Cl.[7] ........................ B65H 59/20; B21C 47/14; D03J 3/00
(52) U.S. Cl. .................... 242/419.4; 242/442; 242/566; 242/588; 289/17
(58) Field of Search ............................ 242/566, 129.53, 242/419.4, 442, 588, 419; 43/4; 289/17

(56) References Cited

U.S. PATENT DOCUMENTS

| 2,479,710 A | * | 8/1949 | Arnold | 43/4 |
| 4,088,275 A | * | 5/1978 | Ramos | 242/566 |
| 4,189,111 A | * | 2/1980 | Doiron | 242/588 |
| 4,418,875 A | * | 12/1983 | Brine | 242/442 |
| D275,593 S | * | 9/1984 | Carter | 242/129.53 |
| 4,870,772 A | * | 10/1989 | Johns | 289/17 |
| 6,179,240 B1 | * | 1/2001 | Todd | 242/129.53 |

FOREIGN PATENT DOCUMENTS

JP      11169049      6/1999

* cited by examiner

*Primary Examiner*—Michael R. Mansen

(57) ABSTRACT

A method and bobbin holder for manufacturing a fishing fly includes a check member for elastically and frictionally engaging the line to provide tension in the line and prevent slackening or loosening of the line when the line is drawn from the bobbin or cut. The bobbin holder is formed from a v-shaped holder having a guide rod extending from the apex of the v-shape and the check member is located between the bobbin and the guide rod. The frictional engagement of the line is a slit formed in an elastic material forming the check member. The slit can be formed by a diametrical cut in a tubular member or be the interface between two layers of the material. A fastener supports the check member between the tube and the bobbin and may also provide a compression to the layers.

17 Claims, 4 Drawing Sheets

METHOD AND BOBBIN HOLDER FOR MANUFACTURING A FISHING FLY

CROSS-REFERENCE TO RELATED APPLICATIONS

This application claims priority under 35 U.S.C. §119 to Japanese Patent Application No. 2000-183758 filed May 16, 2000, the entire contents of which is hereby incorporated by reference.

BACKGROUND OF THE INVENTION

This invention relates to a method and bobbin holder for manufacturing a fly, particularly a fly used in fishing. More particularly the invention relates to a bobbin holder that is provided with a functional check member to prevent the release of a line from the holder during the manufacture of the fly and still further during the manufacture of the fly manually.

Customarily, a fly is used for live bait in fishing and there has been an increase interest in fly fishing. This increased interest has also led to an increased interest in the manual or hand-made tying manufacture of the fly, particularly a favorite fly of the user's choice.

In fly tying a bobbin holder is desirable. The bobbin holder comprises a v-shaped holder of elastic plates and a bobbin. The bobbin provides for winding up a line set on the holder so that a suitable length of the line for making the fly can be drawn out from a guide tube of the holder. The manufacture of the fly includes the use of means for attracting fish, such as feathers or the like from birds or animals.

A bobbin holder is disclosed in published Japanese Patent Application Kokai No. HEI-11-169049. This bobbin holder comprises a check member for preventing the entanglement of a line between a guide tube and a bobbin. This bobbin holder has certain disadvantages in the manufacture of the fly, in particular the manual or hand-made manufacture of the fly. When the line is cut during the fly tying the line has a tendency to be drawn back into the guide tube or the line has a tendency to become twisted about the v-shaped holder or the bobbin. In addition, it may be necessary to set the cut line again into the guide tube by a separate bobbin threader.

SUMMARY OF THE INVENTION

In an embodiment of the invention a bobbin holder comprises an elastic member which can frictionally retain the line.

In an embodiment of the invention a bobbin holder comprises an elastic member having a slit which can frictionally retain the line.

In an embodiment of the invention a bobbin holder comprises an elastic member formed by two mats which can frictionally retain the line.

DETAILED DESCRIPTION OF THE INVENTION

Figure 1:
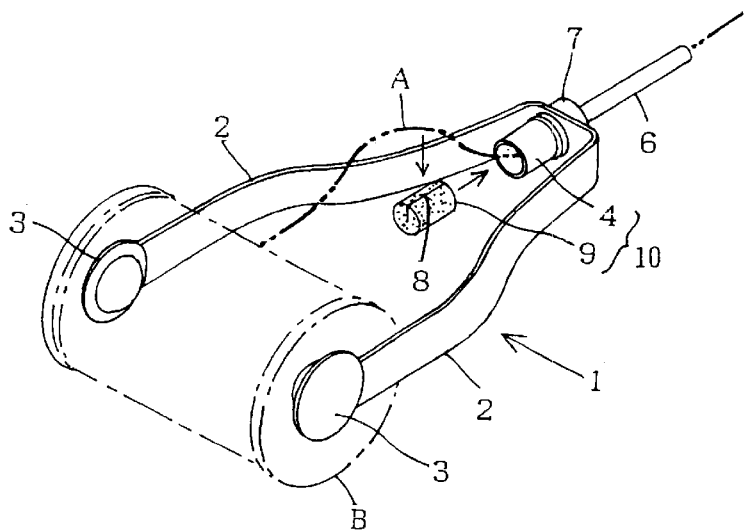
FIG. 1 is a perspective view of a bobbin holder for an embodiment of the invention.

In an embodiment of the invention, as shown in FIGS. 1 to 3 and 6, a bobbin holder 1 comprises a v-shaped elastic holder 2, a bobbin B held between points 3 of the holder, and a check member 10 for prevention of entanglement of a line A. The line A unwinds from the bobbin B and passes between bended portions of the v-shaped elastic holder 2 and may be engaged by the check member and passes through a guide tube 6. The check member 10 comprises a holding tube 4 for receiving an elastic frictional member 9. The cross-sectional configuration of the holding tube 4 and the member 9 can be complimentary or different. As shown in sectional configuration the tube 4 and the member 6 is circular. Means for fastening, such as threaded member 5, engages the inwardly extending guide tube 6, the holding tube and the elastic member 9. Means for fastening, such as screw member 7, engages the threaded member 5 to secure the guide tube 4 and the member 9.

The elastic frictional member 9 includes a slit 8 cut into the central portion, for example approximately one-half the diameter, thereof along the longitudinal length of the member 9. The depth of the cut into the member 9 is intended to be sufficient to frictionally engage the line A when inserted into the slit. The member 9 is inserted into and retained in the holding tube 4. As shown by the arrow in FIG. 2, the line A is inserted into the slit 8 and passes through the guide tube 6 without apparent entanglement.

In use, the line A is wound about the bobbin B and the bobbin B is held elastically between points 3 of the elastic holder 2. The elastic member 9, held within the tube 4, is removed. A length of line A is drawn out from the bobbin A toward the check member 10 and inserted into the slit 8 formed on the elastic member 9. The line A is frictionally held within the slit 8. The member 8 is inserted into the tube 4 such that an end of the line A passes through tube 6 and extends beyond the end of tube 6 as shown in FIG. 2.

Figure 2:
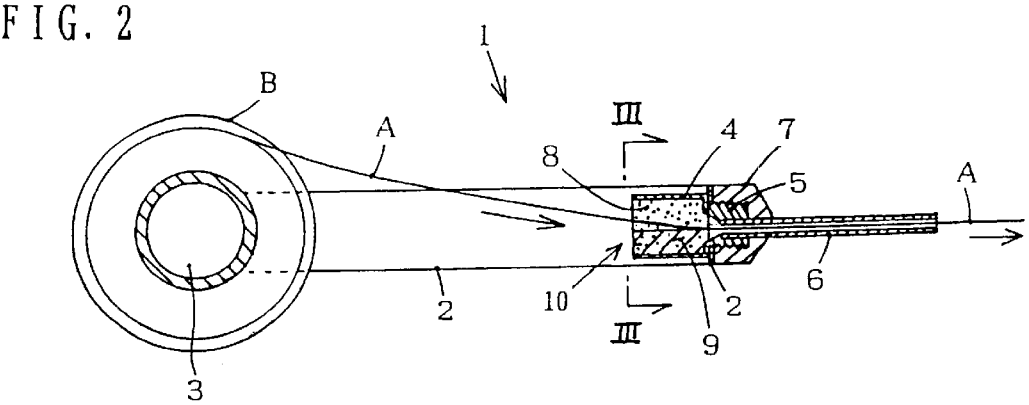
FIG. 2 is sectional side view of the bobbin holder of FIG. 1.
Figure 3:
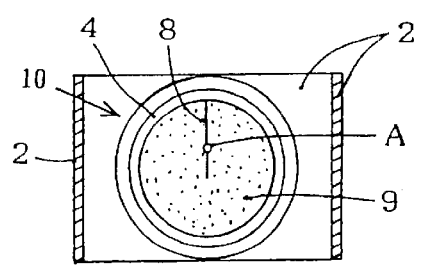
FIG. 3 is a sectional view of the bobbin holder of FIG. 1 along the line III—III of FIG. 2.

Thus, the line A is frictionally held in the tube 4, as shown in FIGS. 2 and 3, for a desirable resistance and tension to prevent entanglement by slackening of the line A and further will not come out of the holding tube 4 and the guide tube 6 even when the line A is cut or the line is further drawn from the bobbin.

Figure 4:
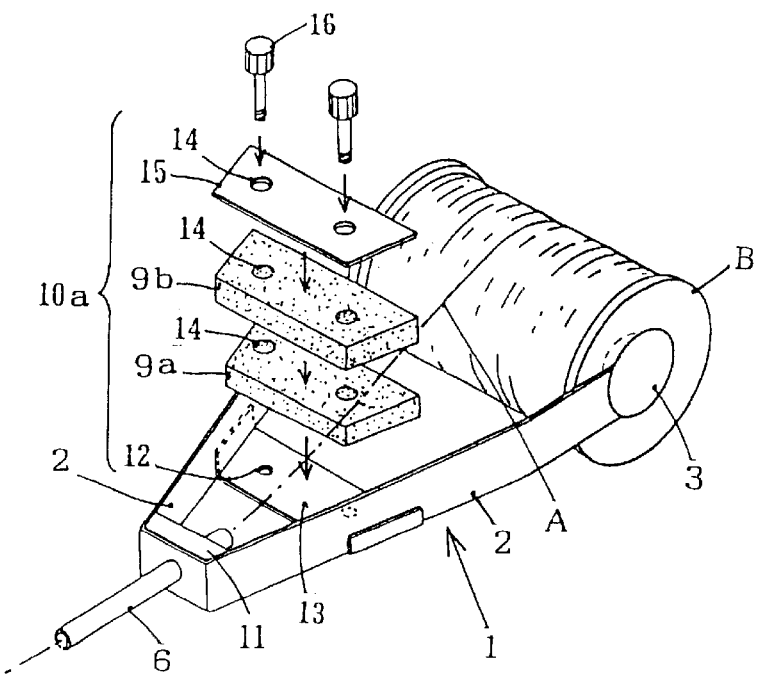
FIG. 4 is a perspective view of a bobbin holder for an embodiment of the invention.
Figure 5:
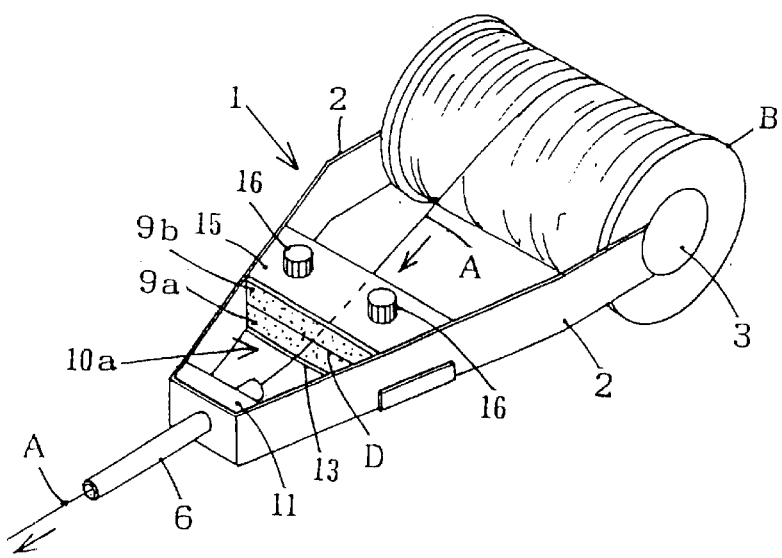
FIG. 5 is another perspective view of the bobbin holder of FIG. 4.

In an embodiment of the invention, as shown in FIGS. 4 and 5, a bobbin holder 1 is substantially similar to the bobbin holder of FIGS. 1 to 3. A v-shaped elastic holder 2 has holding points 3 for a bobbin B. The holder 2 has a base portion 11 at the narrowest portion of the v-shaped holder 2 through which is substantially centrally located a guide tube 6.

A check member 10a is disposed between the elastic sides of the holder 2. Disposed between the elastic sides of holder 2 at substantially a central portion thereof is a base plate 13, a plurality of layers of at least two elastic frictional members 9a, 9b and a pinching plate 15. The base plate 13 is affixed, for example, under the holder 2 and has substantially the same width as the holder 2 at the place of attachment. The frictional members 9a, 9b and a pinch plate 15 have a dimension substantially equal to the length of the plate 13 as measured inside the v-shape of the holder 2. The members 9a, 9b are placed upon the plate 13 and the pinch plate 15 is placed upon the members 9a, 9b. Means for fastening, such as screws 16 pass through respective holes 14 in the plate 15 and members 9a, 9b to engage with plate 13, for example by threaded holes 12 in plate 13. The means for fastening, such as screws 16, causes the pinch plate 15 and the plate 13 to compress the members 9a, 9b as shown by the arrows in FIG. 4.

In use, the line A is drawn out from the bobbin B and is disposed between the members 9a, 9b with an end passing and extending through the tube 6. The line A is held elastically, under tension and frictionally between the plates 9a, 9b to prevent slackening or entanglement of the line or removal from the tube 6 even when the line is cut. The interface D between the plates 9a, 9b are equivalent in function to the slit 8.

The check member 10a is easily adjusted to receive, engage and disengage line A by turning the fastening means, such as screws 16, even if the line A becomes slackened or loose. The confronting surfaces of the members 9a, 9b are of sufficient width to readily frictionally engage the line A and prevent entanglement or slackening of line A during the making of the fly or as well as when the line is cut either inside or outside the bobbin holder or if the line is further drawn from the bobbin.

Figure 7:
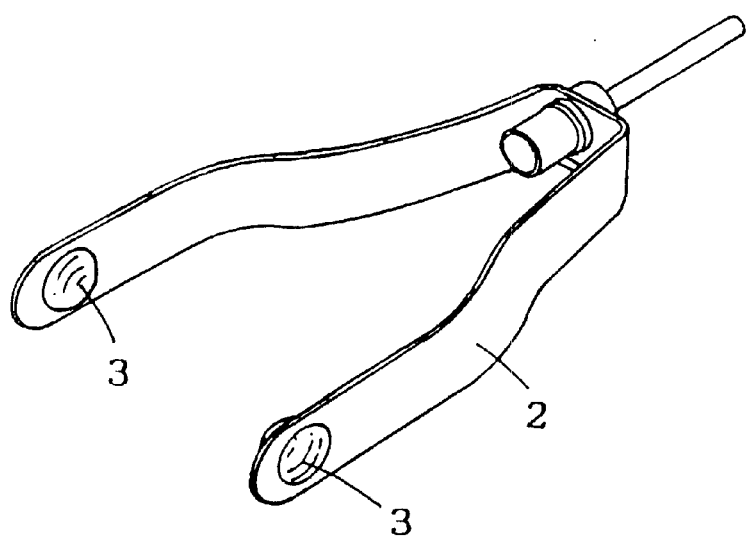
FIG. 7 is a perspective view of an embodiment of a bobbin holder.
Figure 8:
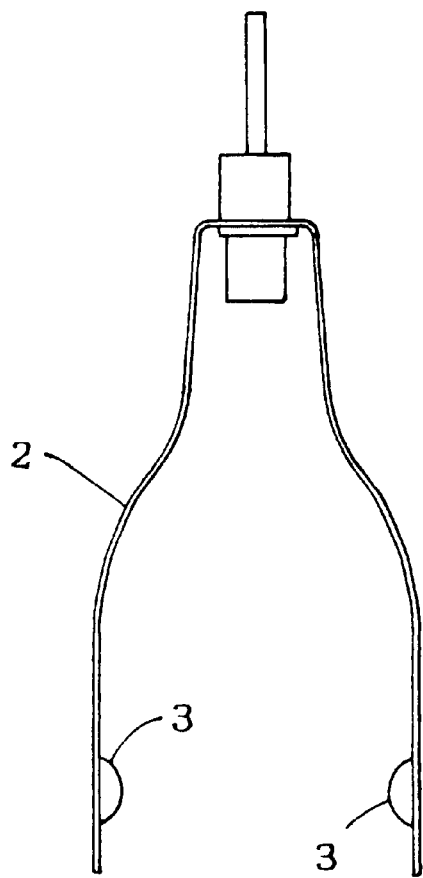
FIG. 8 is a plan view of the bobbin holder of FIG. 7.

FIGS. 7 and 8 show an embodiment of a bobbin holder which may be used with any of the disclosed embodiments. Holding points 3 of the v-shaped elastic holder 2 for elastically holding the bobbin B may comprise two inwardly directed hemispherical holding portions. The holding portions may be selectively disposed at or near the ends of the sides forming the holder 2 or intermediate the length of the sides of the holder. The holding portions can be formed integrally with the holder by pressing or molding or by separately applied hemispherical portions. The hemispherical holding portions provide a convenient means for holding and replacing the bobbin B.

The members 9, 9a and 9b may be formed from any suitable elastic material, such as foamed urethane or an elastomeric or rubber-like materials.

Figure 6:
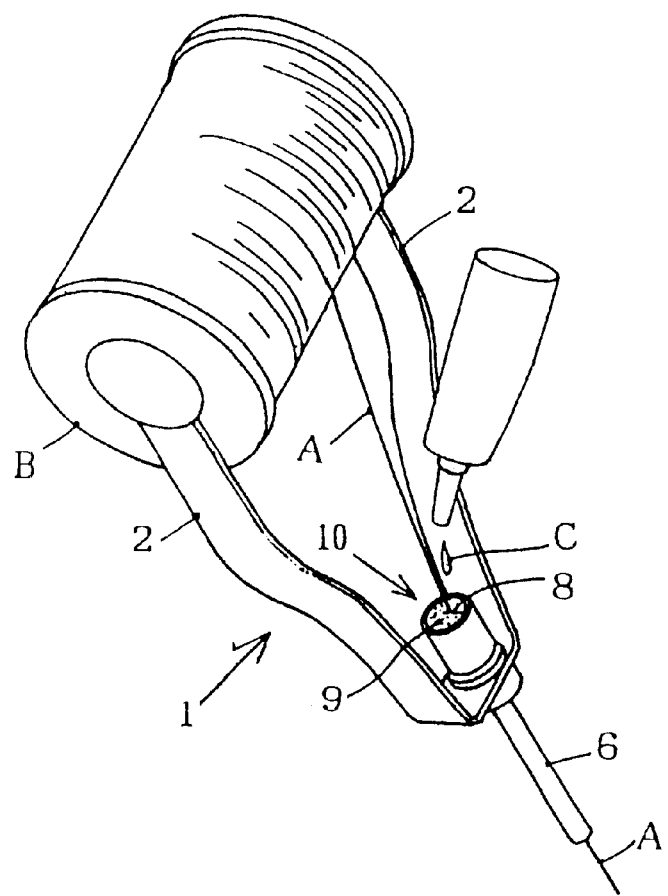
FIG. 6 is a view of the bobbin holder of FIG. 1 showing water repellant treatment.

Line A may be effectively made water repellant material by a coating or by applying a water repellant material C as shown in FIG. 6. The water repellant material is then disposed in the slit 8 or between the members 9a, 9b.

In the embodiment of FIGS. 4 and 5, instead of a plurality of members 9a, 9b a single member can be used wherein the thickness thereof is sufficient to allow the line A to pass through, for example by a slit in the thickness.

In the embodiment of FIGS. 4 and 5, instead of or in addition to the pinch plate 15 or fastening means such as screws 16, the members 9a, 9b can be affixed to each other or to the plate 15 or to the plate 13 by a suitable adhesive.

The thickness of line A does not affect the operational function of frictional members 9, 9a or 9b or the check member 10 or 10a.

The following advantages of the embodiments of the present invention are therefore apparent. The elastic frictional members 9, 9a and 9b, when used with respective check members 10, 10a, provide reliable and suitable tension, prevent loosening and slackening to line A when it is drawn or cut from the bobbin and during use in the making of a fishing fly. When the line A is cut, the line is retained in the tube 6 and thus it is not necessary to reset the line by, for example, a threader. The frictional engagement of the check members 10, 10a is easily varied by the manual adjustment of the fastening means, such as screws 7 and 16. Applying a water repellant to the line is easily performed. Holding and replacement of the bobbin in the bobbin holder is simplified and convenient.

Various modification or substitution of equivalent structures and/or steps and/or functions may be made by those skilled in the art to the disclosed embodiments without departing from the scope and extent of the invention.

What is claimed is:

1. A bobbin holder comprising:
   a guide tube extending from an elastic holder;
   means for supporting a bobbin in the holder;
   a check member between the tube and the means for supporting the bobbin, the check member comprising an elastic material member having formed therein a slit for elastically frictionally engaging a line drawn out from the bobbin.

2. The bobbin holder of claim 1 wherein the check member comprises:
   a longitudinally extending member;
   a holding tube extending from the guide tube for receiving the member; and
   means for fastening the holding tube to the guide tube.

3. The bobbin holder of claim 2 wherein the member has a tubular configuration and the slit extends along the longitudinal length of the configuration at a depth of approximately one-half the diameter of the tubular configuration.

4. The bobbin holder of claim 1 wherein the slit extends longitudinally along one dimension of the member.

5. The bobbin holder of claim 1 wherein:
   the check member is disposed between sides of the bobbin holder;
   the means for supporting the bobbin comprises a hemispherical portion on each side of the holder, the hemispherical portions being inwardly facing.

6. The bobbin holder of claim 5 wherein the hemispherical portions are disposed at or near ends of the sides of the holder or intermediate the length of the sides.

7. The bobbin holder of claim 1 wherein the holder is formed as a v-shaped holder.

8. A bobbin holder comprising:
   sides forming a v-shaped holder;
   a guide tube extending from an apex formed by the v-shape;
   hemispherical means formed on the sides for supporting a bobbin;
   a check member between the tube and the means for supporting the bobbin, the check member comprising a member formed from an elastic material and having a slit formed therein for elastically frictionally engaging a line drawn out from the bobbin.

9. A method for securing a line drawn from a bobbin disposed in a bobbin holder comprising:
   providing a guide tube extending from the holder;
   providing a check member between the tube and the bobbin, the check member having formed therein a slit within the member;
   drawing the line from the bobbin;
   passing the line into and through the slit, the check member being a elastic member which frictionally engages the line; and
   passing the line through the guide tube.

10. A bobbin holder comprising:
    a guide tube extending from an elastic holder;
    means for supporting a bobbin in the holder;

a check member between the tube and the means for supporting the bobbin, the check member comprises a plurality of layers of elastic material between which a line drawn out from the bobbin is elastically frictionally engaged.

11. The bobbin holder of claim 10 wherein the check member comprises:

a base plate disposed between sides forming the bobbin holder;

at least two layers of an elastic material disposed on the base plate;

a pinch plate disposed on the layers of elastic material; and means compressing the layers between the base plate and the pinch plate.

12. The bobbin holder of claim 11 wherein the check member is disposed between sides of the bobbin holder and the layers extend between the sides.

13. The bobbin holder of claim 10 wherein the plurality of layers are joined adhesively.

14. The bobbin holder of claim 10 wherein:

the check member is disposed between sides of the bobbin holder;

the means for supporting the bobbin comprises a hemispherical portion on each side of the holder, the hemispherical portions being inwardly facing.

15. The bobbin holder of claim 14 wherein the hemispherical portions are disposed at or near ends of the sides of the holder or intermediate the length of the sides.

16. The bobbin holder of claim 10 wherein the hemispherical portions are disposed at or near ends of the sides of the holder or intermediate the length of the sides.

17. A method for securing a line drawn from a bobbin disposed in a bobbin holder comprising:

providing a guide tube extending from the holder providing a check member between the tube and the bobbin, the check member comprising a plurality of layers of an elastic material forming an interface;

drawing the line from the bobbin;

passing the line through the interface, the check member being a elastic member which frictionally engages the line at the interface; and passing the line through the guide tube.

* * * * *